(12) United States Patent
Jeannot

(10) Patent No.: US 6,908,207 B2
(45) Date of Patent: Jun. 21, 2005

(54) APPARATUS FOR A MOTOR VEHICLE, FOR LIGHTING BENDS NEGOTIATED BY THE VEHICLE

(75) Inventor: Laurent Jeannot, Bobigny Cedex (FR)

(73) Assignee: Valeo Vision (FR)

( * ) Notice: Subject to any disclaimer, the term of this patent is extended or adjusted under 35 U.S.C. 154(b) by 0 days.

(21) Appl. No.: 10/141,795

(22) Filed: May 8, 2002

(65) Prior Publication Data

US 2002/0196634 A1 Dec. 26, 2002

(30) Foreign Application Priority Data

May 11, 2001 (FR) .............................. 01 06343

(51) Int. Cl.⁷ .............................................. B60Q 1/12
(52) U.S. Cl. ............................ 362/37; 362/40; 362/41; 362/464
(58) Field of Search ............................ 362/37, 39, 40, 362/41, 43, 465, 466, 467, 525, 526, 539, 460, 464, 351, 509

(56) References Cited

U.S. PATENT DOCUMENTS

| | | | | |
|---|---|---|---|---|
| 1,380,495 A | * | 6/1921 | Ducellier | ............... 254/416 |
| 3,522,423 A | * | 8/1970 | Biabaud | ............... 362/43 |
| 4,841,423 A | * | 6/1989 | Luciani | ............... 362/304 |
| 4,878,161 A | * | 10/1989 | Nakata | ............... 362/305 |
| 4,943,893 A | * | 7/1990 | Shibata et al. | ............... 362/37 |
| 6,176,590 B1 | * | 1/2001 | Prevost et al. | ............... 362/37 |
| 6,343,869 B1 | * | 2/2002 | Kobayashi | ............... 362/37 |

FOREIGN PATENT DOCUMENTS

| | | |
|---|---|---|
| FR | 1 536 280 A | 8/1968 |
| FR | 2 727 497 A | 5/1996 |
| FR | 2 760 705 A | 9/1998 |
| JP | 406087371 A * | 3/1994 |

OTHER PUBLICATIONS

US 6,176,560, 1/2001, Prevost et al. (withdrawn)

* cited by examiner

*Primary Examiner*—Sandra O'Shea
*Assistant Examiner*—Hargobind S. Sawhney
(74) *Attorney, Agent, or Firm*—Morgan & Finnegan, LLP

(57) ABSTRACT

A motor vehicle has at its front end, a pair of passing or dipped beam headlights and a separate pair of cruising or main beam headlights. The passing headlights and cruising headlights produce, respectively, a regulation, short range, dipped passing beam and a regulation, long range, main or cruising beam. A control unit, when the vehicle is negotiating a bend in passing beam mode, causes at least one of the cruising main beam lights to emit an additional bend beam for lighting into the bend. This bend beam increases the light intensity generally in the direction of the bend.

16 Claims, 3 Drawing Sheets

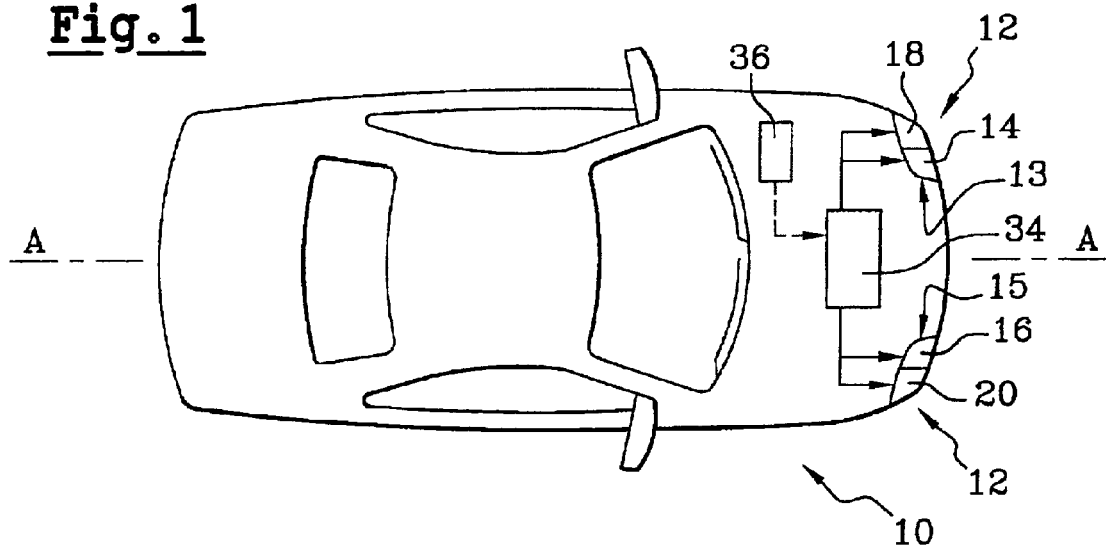
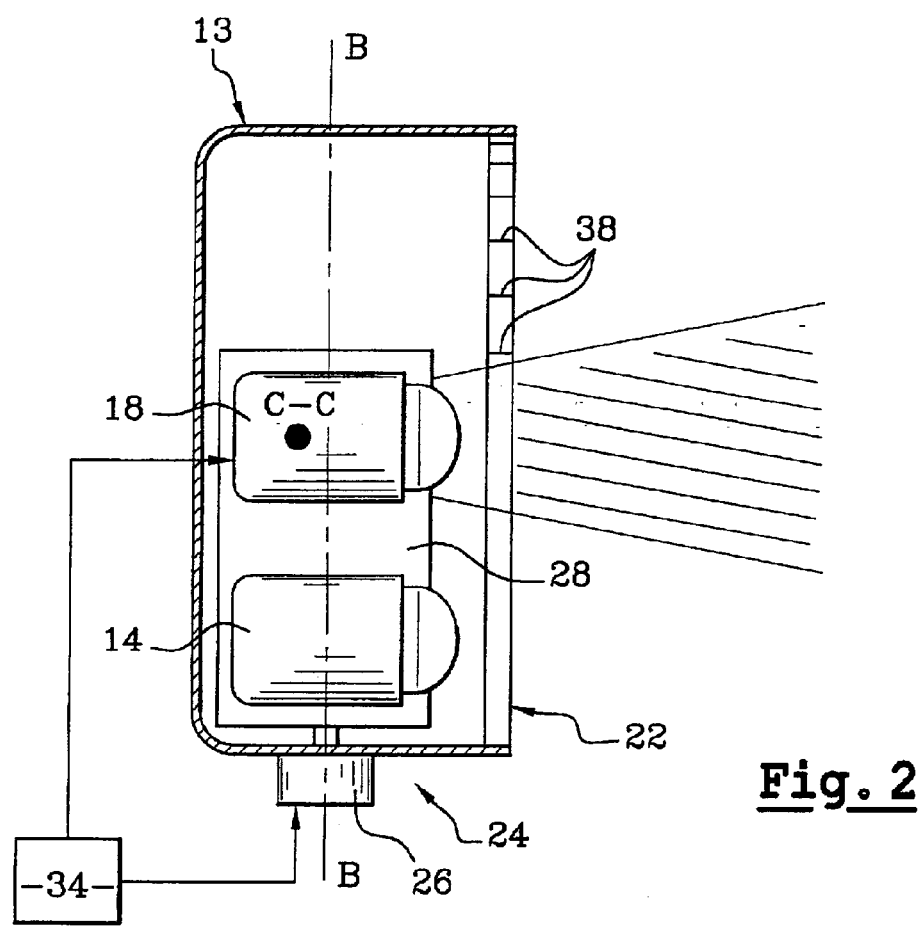

APPARATUS FOR A MOTOR VEHICLE, FOR LIGHTING BENDS NEGOTIATED BY THE VEHICLE

FIELD OF THE INVENTION

The present invention relates to lighting apparatus for a motor vehicle.

More particularly, the present invention relates to lighting apparatus which is arranged at the front of a motor vehicle on each side of its longitudinal axis, and comprising, firstly, a pair of short-range passing headlights, namely a left hand passing headlight and a right hand passing headlight respectively, for emitting a regulation dipped passing beam, and secondly, a pair of long-range or cruising headlights, namely a left hand cruising headlight and a right hand cruising headlight respectively, for producing a regulation long-range cruising or main beam, the apparatus being of the type in which the dipped passing beam has a directional limit, or cutoff, above which the light intensity emitted is weak, and of the type in which the cruising or main beam is generally centred on a point of concentration which is situated on the longitudinal axis of the vehicle.

The invention, in other words, relates to lighting apparatus in which the headlights are not of the so-called dual-function type, that is to say, in the present case, each passing headlight is distinct from the associated cruising headlight, by contrast with a dual-function headlight which includes, for example, a lamp having two filaments, namely a main beam filament and a dipped beam filament, fitted in a single reflector.

BACKGROUND OF THE INVENTION

Regulation light beams produced by motor vehicle headlights are not generally well adapted to travelling round a bend, because they are oriented in a manner which is fixed and generally directed longitudinally forward. But when the vehicle is passing round a bend, the driver ideally needs lighting which is directed preferentially into the bend, so that the bend itself is properly illuminated and he is enabled to anticipate the remainder of the bend and can more readily put the vehicle in its best path.

There are, in the main, three known solutions for producing light beams which are specifically adapted for negotiating bends.

One solution to this problem which is already known makes use of the passing headlights of the vehicle, in that they are mounted for pivoting movement to follow the direction of the bend. For example, in a left hand bend, the left passing headlight pivots to the left, and in a right hand bend, the right hand passing light pivots to the right. This arrangement is not satisfactory, because, in order to mount a passing headlight pivotally, the characteristics of the cutoff in the regulation dipped beam are modified, and in particular the distribution of light intensity around the cutoff. This makes it difficult to ensure that the lighting apparatus continues to comply with current applicable law.

Another known arrangement involves the use of small additional driving lights, for example the foglight module. These additional lights are oriented in the direction of the bend as a function of the angle of rotation of the steering wheel and the forward speed of the vehicle.

In a third known type of solution, two small additional driving lights are used, each of which is pre-oriented to one side of the longitudinal axis of the vehicle. The right and left additional lights are for example oriented in two horizontal directions which describe an angle of 45°, to the left and the right respectively, with respect to the longitudinal axis of the vehicle. The light intensity produced by these additional lights may be controlled as a function of the angle of rotation of the steering wheel and the forward speed of the vehicle, as in the previous example.

These last two known arrangements make it necessary to provide an additional lighting module. In addition, the light flux produced by the additional lights is quite small.

DISCUSSION OF THE INVENTION

An object of the invention is to overcome the above mentioned disadvantages.

According to the invention, lighting apparatus which is arranged at the front of a motor vehicle on each side of its longitudinal axis, and comprising, firstly, a pair of short-range passing headlights, namely a left hand passing headlight and a right hand passing headlight respectively, for emitting a regulation dipped passing beam, and secondly, a pair of long-range cruising headlights, namely a left hand cruising headlight and a right hand cruising headlight respectively, for producing a regulation long-range cruising or main beam, the apparatus being of the type in which the dipped or passing beam has a directional limit, or cut off, above which the light intensity emitted is weak, and of the type in which the cruising or main beam is generally centred on a point of concentration which is situated on the longitudinal axis of the vehicle, is characterised in that that apparatus further includes a control unit for the headlights which, when the vehicle is negotiating a bend in dipped or passing beam mode, controls at least one of the cruising headlights in such a way that the beam emitted by the latter defines an additional beam for illuminating the bend, that is to say a bend beam which increases the emitted light intensity generally in the direction of the bend.

Preferably, the zone of maximum light intensity of the bend beam is offset horizontally in the direction of the bend with respect to the zone of maximum light intensity of the passing beam.

According to a preferred feature of the invention, the bend beam is situated generally below the cutoff. Preferably, the illuminating beam produced by the cruising headlights is always situated generally below the cutoff of the passing beam.

According to another preferred feature of the invention, the control unit controls the orientation of the bend beam as a function of the steering angle of the steerable wheels of the vehicle, so that, the tighter the bend, the more will the bend beam be offset horizontally in the direction of the bend.

According to yet another preferred feature of the invention, the apparatus further includes means for reducing the maximum light intensity of the light beam produced by the cruising headlights when they are producing a bend beam. Preferably, the control unit controls the light intensity emitted by the light source of each cruising headlight.

According to a further preferred feature of the invention, the cruising headlights include means for horizontally spreading their light beam when they are producing a bend beam, whereby, the tighter the bend, the greater is the horizontal spreading of the bend beam. Preferably, each cruising headlight includes a front protective lens having ribs for spreading the light beam when it is producing a bend beam.

According to a still further preferred feature of the invention, the control unit controls, in horizontal displacement, the light source and/or the reflector of each cruising headlight whereby to produce a bend beam.

According to another preferred feature of the invention, when the vehicle is negotiating a bend in passing beam mode, the control unit lights either the left hand cruising headlight if the bend is a left hand bend, or the right hand cruising headlight if the bend is a right hand bend.

Further features and advantages of the present invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 1 is a diagram showing a vehicle having lighting apparatus in accordance with the features of the invention.

FIG. 2 is a top plan view showing diagrammatically the left hand lighting cluster of the vehicle in FIG. 1, with the cruising headlight oriented for emitting a long-range cruising (main) beam.

DESCRIPTION OF PREFERRED EMBODIMENTS OF THE INVENTION

Figure 3:
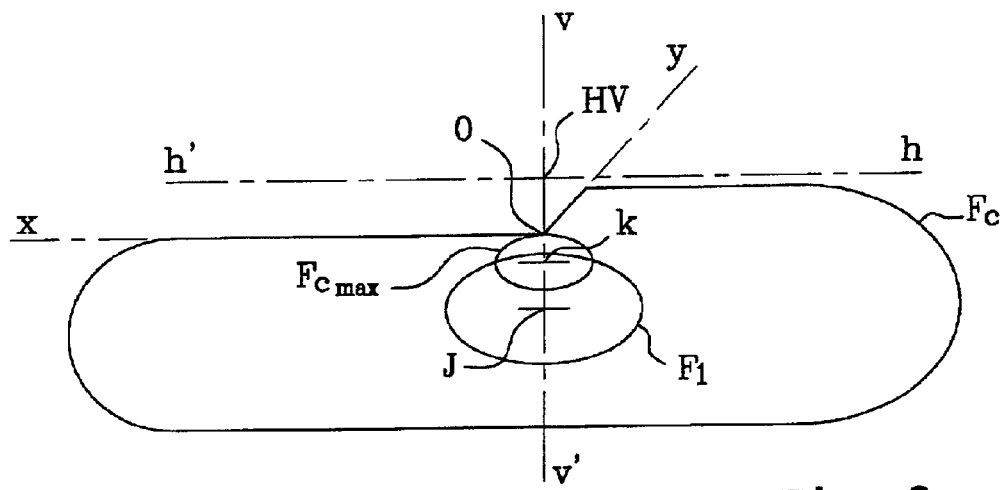
FIG. 3 is a diagram showing a regulation light beam for a passing headlight, and the light beam produced by the associated cruising headlight.

FIG. 1 shows a motor vehicle 10 having lighting apparatus 12 made in accordance with the features of the present invention. The words "front" and "rear", and other words requiring a front and a rear to be identified, will be used, for the purpose of this description, without any limitation being thereby imposed, to relate to an orientation from the rear to the front of the vehicle 10, along the longitudinal axis A—A of the vehicle, that is to say from left to right in FIGS. 1, 2 and 5.

The lighting apparatus 12 is arranged at the front of the vehicle 10, and comprises two lighting clusters, namely a left hand cluster 13 and a right hand cluster 15, which are disposed substantially symmetrically with respect to a plane of vertical symmetry passing through the longitudinal axis A—A.

Each lighting cluster 13 or 15 comprises a short-range passing headlight, 14 and 16 respectively, adapted for emitting a dipped beam, together with a separate long-range cruising or main beam headlight, 18 and 20 respectively. The lights 14 and 18 are mounted behind a common front lens 22, and the lights 16 and 20 are similarly mounted behind a common front lens 22. FIG. 2 shows the left hand cluster 13 in simplified form.

In the embodiment shown here, the passing headlights 14 and 16 are mounted inboard of the cruising headlights 18 and 20 respectively, that is to say between the cruising headlights and the axis A—A of the vehicle. It should of course be understood that it is equally possible to put the passing headlights outboard of the cruising lights.

The headlights 14, 16, 18 and 20 are made by known techniques. Each of the passing headlights 14, 16 has as its light source for example a lamp of the discharge type which is arranged behind the lens, while the light source of each of the cruising lights 18, 20 is a lamp which may be a filament lamp or a lamp of a kind creating an electric arc, the lamp being arranged within a reflector having a complex surface. Other types of headlights may also be used.

When lit, the passing lights 14 and 16 together produce a regulation passing beam Fc (FIG. 3), i.e. a beam of the short range or dipped type. This beam is characterised in particular by a so-called cut-off, that is to say a directional limit above which the light intensity emitted is weak. This cutoff generally consists of a horizontal half plane, to the left of the longitudinal axis of the headlight (for driving on the right), together with a half plane which is slightly inclined upwards, to the right of the said longitudinal axis. The last mentioned half plane is raised through a so-called cut-off elevation angle, which is 15° in a normalised European beam.

The illumination produced by the passing beam Fc on a screen placed about 25 meters in front of the passing headlights 14 and 16 is shown in FIG. 3. In this Figure, the point HV is the trace of the longitudinal axis A—A of the vehicle, and the intersection of a vertical plane v'v and a horizontal plane h'h. The cut-off is defined by the straight half line Ox which extends parallel to, and below, the horizontal axis h'h towards the left from the point O, and by the straight half line Oy which is inclined by 15° and extends from the point O upwards and to the right. The light patch which is formed on the screen by this dipped beam comprises a zone Fcmax of maximum light intensity, which is centred generally on a point K situated close to the vertical axis v'v, below the point O and slightly offset to the right.

It will be noted here that this description relates to a vehicle driving on the right. For driving on the left, it is sufficient to consider the drawings as showing the screen reversed with respect to the vertical axis v'v.

Each lighting cluster 13 or 15 in this example includes an attitude corrector 24, which is controlled by a control unit 34, as indicated diagrammatically in FIG. 2. It should also be noted that European regulations require that passing headlights having a discharge type lamp must be equipped with an automatic attitude corrector, though this is the preferred arrangement in any case.

FIG. 2 shows diagrammatically the attitude corrector 24, in the form of an electric motor 26 which is arranged to cause pivoting movement, about a transverse axis B—B which is substantially horizontal and at right angles to the main axis A—A of the vehicle, of a support 28 which carries the passing headlight 14 and the associated cruising headlight 18.

Pivoting movement of the support 28 about the transverse axis B—B is produced by the control unit 34, in particular in such a way as to correct the attitude of the dipped beam Fc, that is to say the inclination of the dipped beam with respect to the longitudinal axis A—A, as a function of the variations that occur in the attitude of the vehicle 10. These attitude variations generally appear during acceleration phases and braking phases of the vehicle.

In the embodiment shown here, the cruising headlights 18 and 20 are arranged on their supports with respect to the associated passing lights 14 and 16, in such a way that they produce a beam F1 which lies always generally under the cut-off of the passing beam Fc.

When the lighting apparatus 12 is operating in its passing beam mode, producing the beams Fc, the horizontal portion Ox of the cut-off has to be situated below the horizontal axis H'h so as not to dazzle the occupants of vehicles travelling in the opposite direction. In consequence, if the cruising headlights 18 are lit in this situation, the illuminating beam F1 produced by the cruising lights 18 will be generally centred on a point of concentration J situated on the vertical axis v'v, below the point HV, as is shown in FIG. 3.

Figure 4:
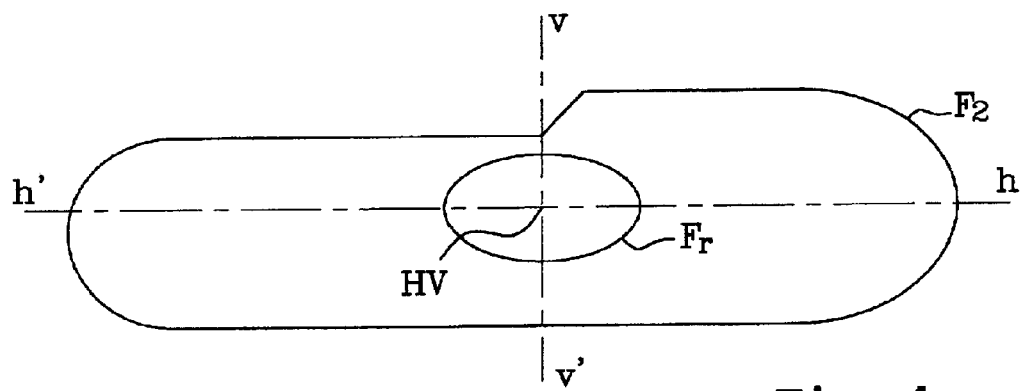
FIG. 4 is a diagram similar to FIG. 3, but shows a regulation beam for a long-range cruising headlight, and the light beam produced by the associated passing headlight.

A regulation cruising or main beam Fr is obtained by operation of the attitude corrector 24 of each lighting cluster 13 or 15 in such a way that it raises the beam F1 produced by the cruising lights 18 and 20, until its concentration point J substantially coincides with the point HV, as shown in FIG. 4.

In a manner known per se, when a regulation main or cruising beam Fr is produced, the passing headlights 14 and 16 and the cruising headlights 18 and 20 may be lit simultaneously so that the illuminating beam F2 produced by the passing headlights 14 and 16 enriches the main beam Fr produced by the cruising lights.

When the cruising lights 18 and 20 are giving the regulation main beam, they occupy a main beam position which is shown in FIG. 2, in which they are oriented generally along the vehicle main axis A—A.

When the vehicle is travelling round a bend in passing beam mode, the control unit 34 controls at least one of the cruising headlights 18, 20 in such a way that its beam forms an additional beam to illuminate the bend, otherwise referred to as a bend beam Fv, which augments the light intensity emitted generally in the direction of the bend.

Preferably, when the vehicle is negotiating a bend using the passing beam Fc, the bend being oriented to the left or to the right, the control unit 34 lights the left hand main beam headlight 18 or the right hand main beam headlight 20 respectively, and causes its light beam F1 to be displaced substantially horizontally to the left or right respectively.

Preferably, the zone of maximum light intensity Fvmax of the bend beam Fv is offset horizontally with respect to the zone of maximum light intensity Fcmax of the passing beam Fc on the side of the bend.

In the embodiment shown here, the main beam headlight 18 is for example mounted for rotation about an axis C—C which is substantially vertical, so that the control unit 34 can control its pivoting movement about the axis C—C in the direction of the bend. For example, with reference to FIG. 5, the control unit 34 has caused pivoting movement of the left hand main beam headlight 18 to take place in the anticlockwise direction, in such a way as to produce a beam Fvg for a left hand bend.

Figure 6:
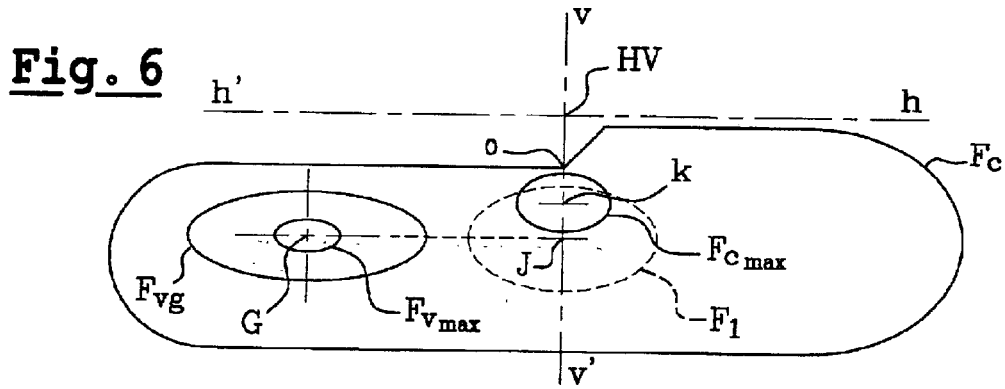
FIG. 6 is a diagram similar to FIG. 3, but shows the regulation beam for a passing driving light and the bend beam directed to the left.

Referring now to FIG. 6, this shows the illuminating beams produced by the passing headlights 14 and 16 and by the cruising headlights 18 and 20, when the lighting apparatus 12 is working in passing beam mode, i.e. producing the beam Fc. The zone in FIG. 6 denoted by a broken line and centred on the point J shows the light beam F1 which is produced by the passing lights 18 and 20 when they are oriented for operating as main beam lights.

The left hand bend beam Fvg produced by the left hand cruising headlight 18 when the vehicle is negotiating a left hand bend in passing beam mode, with the beam Fc, is shown in FIG. 6 centred on the point G.

Since the light beam F1 produced by the cruising lights 18 and 20 is always situated below the cut-off, no light rays are produced that will be dazzling for drivers of vehicles travelling in the opposite direction, even when the cruising lights 18 and 20 are producing a bend beam Fv.

In the preferred embodiment of the invention, the control unit 34 controls the cruising lights 18 and 20 on a bend as a function of the steering angle of the steered wheels of the vehicle, so that the tighter the bend, the higher will be the horizontal off-set of the bend beam Fv towards the bend. To this end, the control unit 34 measures for example the angle of rotation of the steering wheel of the vehicle, by means of a sensor 36.

In a further embodiment, not shown, regardless of the form of the bend, the cruising light 18 or 20 used to produce the bend beam Fv pivots about the axis C—C through a fixed angle with respect to the longitudinal axis A—A of the vehicle. This fixed angle may for example be 45°.

Preferably, the lighting apparatus 12 also includes means for reducing the maximum light intensity in the beam produced by the cruising headlights 18 and 20 when they are producing a bend beam Fv, so that the light intensity of the bend beam Fv lies within a regulation range of values.

Figure 5:
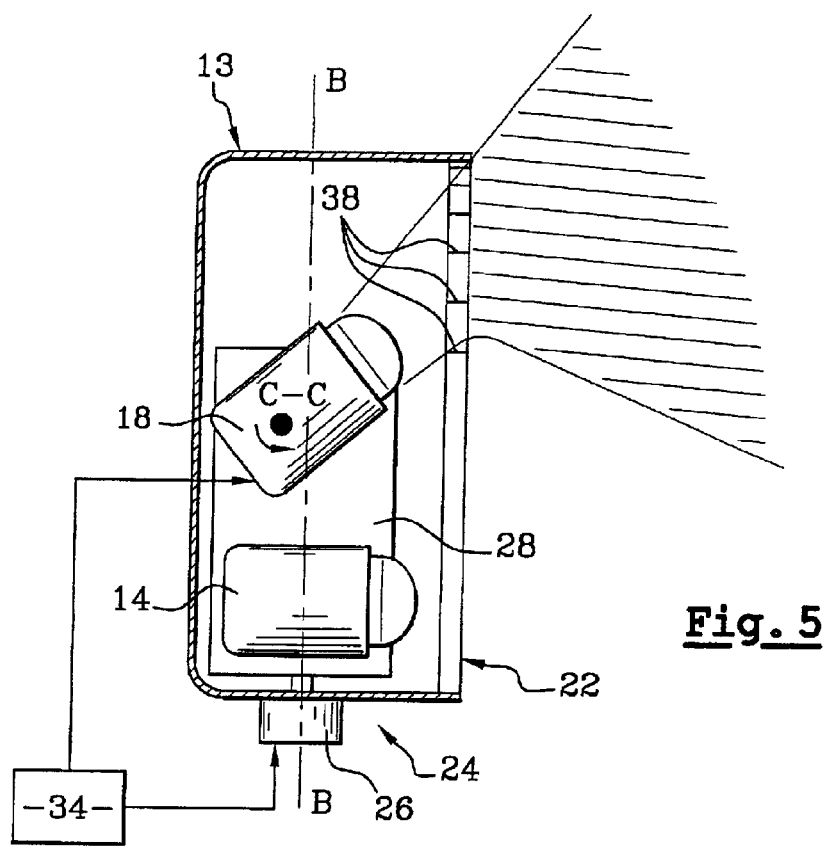
FIG. 5 is a view similar to FIG. 2, but shows, diagrammatically, the cruising headlight in a different orientation in which it is giving a bend beam directed towards the left.

In the embodiment shown in FIGS. 2 and 5, the protective lens 22 of each main beam headlight 18 and 20 has generally vertically oriented ribs 38 which cause the bend beam Fv to be spread horizontally by refraction. The ribs 38 are preferably increasingly deviant, to the left for the left hand headlight 18 and to the right for the right hand light 20, being for example closer together so that, the tighter the bend, the more the bend beam Fv is spread and the weaker is its maximum light intensity.

It will be noted that the protective lens 22 may also have additional ribs (not shown), which are so arranged as to create a cut-off in the bend beam Fv, in particular for the purpose of keeping the bend beam Fv below the cut-off of the passing beam Fc.

In a further version, the control unit 34 may control the light source of each main beam headlight 18 and 20 in such a way as to reduce the light intensity of the illuminating beam produced by the cruising headlights 18 and 20 when they are producing a bend beam Fv.

It is generally unnecessary to provide a bend beam Fv when the vehicle 10 is travelling in main beam mode, i.e. with the main beam Fr. However, in a modified version of the invention (not shown), the control unit 34 may control the cruising headlights 18 and 20 in such a way that they produce a long range or main beam Fr which is horizontally offset into the bend.

Figure 7:
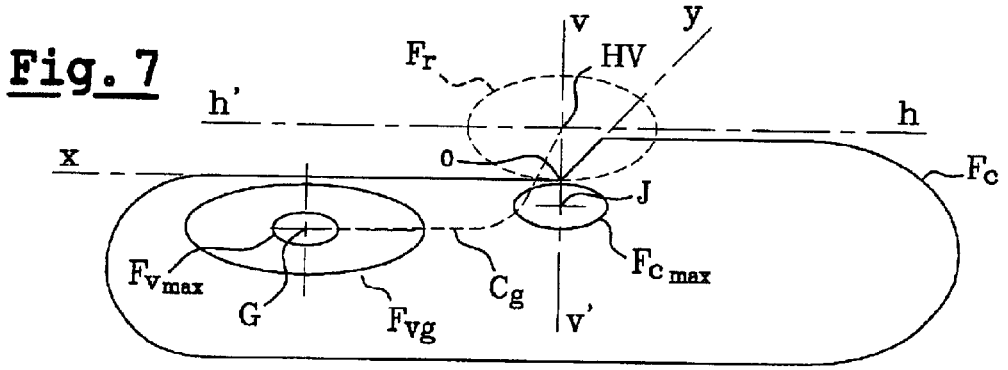
FIG. 7 is a diagram similar to FIG. 3, and shows the regulation passing headlight beam and the leftward bend beam which are produced by a lighting apparatus in a second embodiment of the invention.

In a further embodiment of the invention, not shown, the cruising headlights 18 and 20 are totally independent of the associated passing headlights 14 and 16. In this case they are for example mounted on their own supports, and they have their own dedicated attitude corrector similar to that described above. In this version, when the main beam headlights 18 and 20 are producing the main beam Fr, this main beam, shown in broken lines in FIG. 7, is centred generally on the point HV, and is situated above the cut-off of the passing beam Fc. The bend beam Fvg produced by the left hand cruising headlight 18 when the vehicle is negotiating a bend in passing beam mode, with the beam Fc, is shown centred on the point G. In order to produce this bend beam Fvg, the control unit 34 accordingly controls the left hand cruising headlight 18 in such a way as to cause its beam to be displaced downwards and to the left. The beam from the left hand cruising light 18 then describes generally a curve Cg which crosses the cut-off, from the point HV to the point G.

In passing beam mode, with the beam Fc, and on a bend, for example a left hand bend, the left hand cruising headlight 18 must light up only when its beam is situated below the cut-off of the regulation dipped or passing beam Fc.

In other embodiments not shown, the light intensity of the bend beams Fv and their orientation may be controlled in accordance with additional operating parameters, for example as a function of the longitudinal speed of the vehicle.

The invention is of course also applicable to a lighting apparatus 12 which does not have an attitude corrector. In that case, a specific displacement device, not shown, is provided, and is arranged for example to modify the orientation of the beam produced by the cruising headlights 18 and 20 in order to give a suitable bend beam (Fv).

What is claimed is:

1. A lighting apparatus for a motor vehicle defining a longitudinal axis of the vehicle, the apparatus being disposed in a front of the vehicle on either side of said axis, the apparatus comprising:
   a left hand short range passing headlight and a right hand short range passing headlight, for producing a regulation dipped passing beam;
   a left hand long range cruising headlight and a right hand long range cruising headlight for producing a regulation main beam,
   the apparatus being adapted to define said passing beam that has a cutoff above which any light intensity emitted is weak, and the apparatus further defining a point of concentration on said axis, said cruising headlights being adapted to produce said main beam generally centered on said point of concentration, wherein the apparatus further comprises a control unit coupled to said cruising headlights so that, when the vehicle is negotiating a bend in the passing beam mode, said control unit rotating at least one of said cruising headlights to emit a bend beam such as to increase light intensity emitted generally in a direction of the bend.

2. The apparatus according to claim 1, wherein said passing headlights define a zone of maximum light intensity of the passing beam, and said cruising headlights define a zone of maximum light intensity of said bend beam offset horizontally in the direction of the bend with respect to said zone of maximum light intensity of said passing beam.

3. The apparatus according to claim 1, wherein said cruising headlights define said bend beam situated generally below said cutoff.

4. The apparatus according to claim 3, wherein said cruising headlights are arranged so that said main beam and said bend beam are situated generally below said cutoff.

5. The apparatus according to claim 1, for the vehicle having a plurality of steerable wheels, said control unit being responsive to a steering angle defined by the steerable wheels, said control unit being further adapted to change the orientation of said bend beam as a function of said steering angle, by offsetting said bend beam horizontally in the direction of the bend, whereby, the tighter the bend, the greater is said offset.

6. The apparatus according to claim 1, further comprising means for reducing the maximum light intensity of said bend beam produced by said cruising headlights when said cruising headlights are producing said bend beam.

7. The apparatus according to claim 6, wherein said control unit is adapted to control an intensity of light emitted by said light source of each of said cruising headlights.

8. The apparatus according to claim 7, wherein said cruising headlights include means for spreading said bend beam, whereby the tighter the bend, the greater the spread of said bend beam.

9. The apparatus according to claim 8, wherein each of said cruising headlights comprises a front protective lens having a plurality of ribs adapted and disposed to spread said bend beam.

10. The apparatus according to claim 1, wherein each of said cruising headlights comprises a reflector and a light source mounted in the reflector, and means mounting at least one of said light source and reflector adapted to permit a horizontal displacement, said means being connected to said control unit whereby said control unit can cause said horizontal displacement to take place so that said cruising headlights produce said bend beam.

11. The apparatus according to claim 1, wherein said control unit is connected to said cruising headlights in such a way that, when the vehicle, in the passing beam mode, is negotiating a left hand bend, said control unit lights said left hand cruising headlight, and when the vehicle, in the passing beam mode mode, is negotiating a right hand bend, said control unit lights said right hand cruising headlight.

12. A motor vehicle comprising:
   a front;
   a pair of passing headlights adapted to produce a regulation dipped passing beam in a passing beam mode, the passing headlights disposed in the front on either side of a longitudinal axis of the vehicle, wherein said passing beam has a cutoff above which any light intensity emitted is weak, and defining a point of concentration on said longitudinal axis;
   a pair of cruising headlights adapted to produce a regulation main beam in a main beam mode, the cruising headlights disposed in the front on either side of said longitudinal axis, wherein said cruising headlights are adapted to produce said main beam generally centered on said point of concentration; and
   a control unit coupled to said cruising headlights so that, when the vehicle is negotiating a bend in the passing beam mode, said control unit rotating at least one of said cruising headlights to emit a bend beam to increase light intensity emitted generally in a direction of the bend.

13. The motor vehicle according to claim 12, wherein each of said cruising headlights comprises a front protective lens having a plurality of ribs adapted and disposed to spread said bend beam.

14. The motor vehicle according to claim 13, wherein said ribs are adapted so that the tighter the bend, the greater the spread of said bend beam.

15. The motor vehicle according to claim 14, comprising a plurality of steerable wheels, and
   wherein said control unit is adapted to change an orientation of said bend beam as a function of a steering angle defined by the steerable wheels.

16. A motor vehicle comprising:
   a front;
   a plurality of steerable wheels;
   a pair of passing headlights adapted to produce a regulation dipped passing beam in a passing beam mode, the passing headlights disposed in the front on either side of a longitudinal axis of the vehicle, said passing beam having a cutoff above which any light intensity emitted is weak, and said main beam being generally centered on a point of concentration on said longitudinal axis,
   a pair of cruising headlights adapted to produce a regulation main beam in a main beam mode, the cruising headlights disposed in the front on either side of said longitudinal axis, said cruising headlights being adapted to produce said main beam and said bend beam being generally below the cutoff, each of said cruising headlights comprising a front protective lens having a plurality of ribs adapted and disposed to spread said bend beam, said ribs being adapted so that the tighter the bend, the greater the spread of said bend beam;

a control unit coupled to said cruising headlights so that, when the vehicle is negotiating a bend in the passing beam mode, said control unit rotating at least one of said cruising headlights to emit a bend beam to increase light intensity emitted generally in a direction of the bend, wherein said control unit is adapted to change an orientation of said bend beam as a function of a steering angle defined by the steerable wheels.

* * * * *